(12) United States Patent
Gerresheim et al.

(10) Patent No.: US 6,672,351 B1
(45) Date of Patent: Jan. 6, 2004

(54) VEHICLE TIRE WITH CONTINOUSLY REDUCING VERTICAL SPACING OF TREAD SURFACE WITH RESPECT TO BREAKER

(75) Inventors: Manfred Gerresheim, Oberthausen (DE); Klaus Riehl, Grundau (DE); Saburo Miyabe, Grosseuhaim (DE); Hans-Joachim Winter, Gelnhausen (DE)

(73) Assignee: Dunlop GmbH, Hanau (DE)

( * ) Notice: Subject to any disclaimer, the term of this patent is extended or adjusted under 35 U.S.C. 154(b) by 202 days.

(21) Appl. No.: 09/807,505
(22) PCT Filed: Aug. 26, 2000
(86) PCT No.: PCT/EP00/08330
§ 371 (c)(1), (2), (4) Date: Jul. 10, 2001
(87) PCT Pub. No.: WO01/15917
PCT Pub. Date: Mar. 8, 2001

(30) Foreign Application Priority Data

Aug. 31, 1999 (DE) .......................... 199 41 340

(51) Int. Cl.$^7$ .............. B60C 3/06; B60C 9/18; B60C 9/28; B60C 11/00; B60C 17/00
(52) U.S. Cl. .............. 152/209.8; 152/209.1; 152/209.14; 152/456; 152/517; 152/538
(58) Field of Search ............... 152/517, 538, 152/209.1, 456, 209.8, 209.14

(56) References Cited

U.S. PATENT DOCUMENTS

| | | | | |
|---|---|---|---|---|
| RE30,137 E | * | 11/1979 | Messerly | ............ 152/517 |
| 5,464,899 A | * | 11/1995 | Freeman et al. | ....... 152/517 X |
| 5,630,892 A | * | 5/1997 | Williams et al. | ...... 152/538 X |

FOREIGN PATENT DOCUMENTS

| | | | |
|---|---|---|---|
| EP | 658450 | 6/1995 | |
| EP | 0 748 705 A2 | * 12/1996 | ............ 152/209.14 |
| WO | 9936278 | 7/1999 | |

OTHER PUBLICATIONS

Patent Abstracts of Japan, vol. 1997 No. 12, of JP 9–207515 A, Aug. 12, 1997, Bridgestone Corp.

* cited by examiner

Primary Examiner—Adrienne C. Johnstone
(74) Attorney, Agent, or Firm—Birch, Stewart, Kolasch & Birch, LLP

(57) ABSTRACT

A vehicle tire comprises a carcass ply (1) extending between two bead regions, a tread region disposed between side walls (7,8) and having a tread surface (6) curved in the axial direction and also a breaker (5) reinforcing the tread region and arranged between the carcass ply and tread region, characterised in that in the normally inflated state of the tyre mounted on a tyre rim, the vertical spacing of the tread surface (6) with respect to the breaker continuously reduces, starting from the region of the tyre centre (3), towards the breaker edges (13, 14) and in that the side walls (7, 8) are made at least substantially self-supporting.

17 Claims, 1 Drawing Sheet

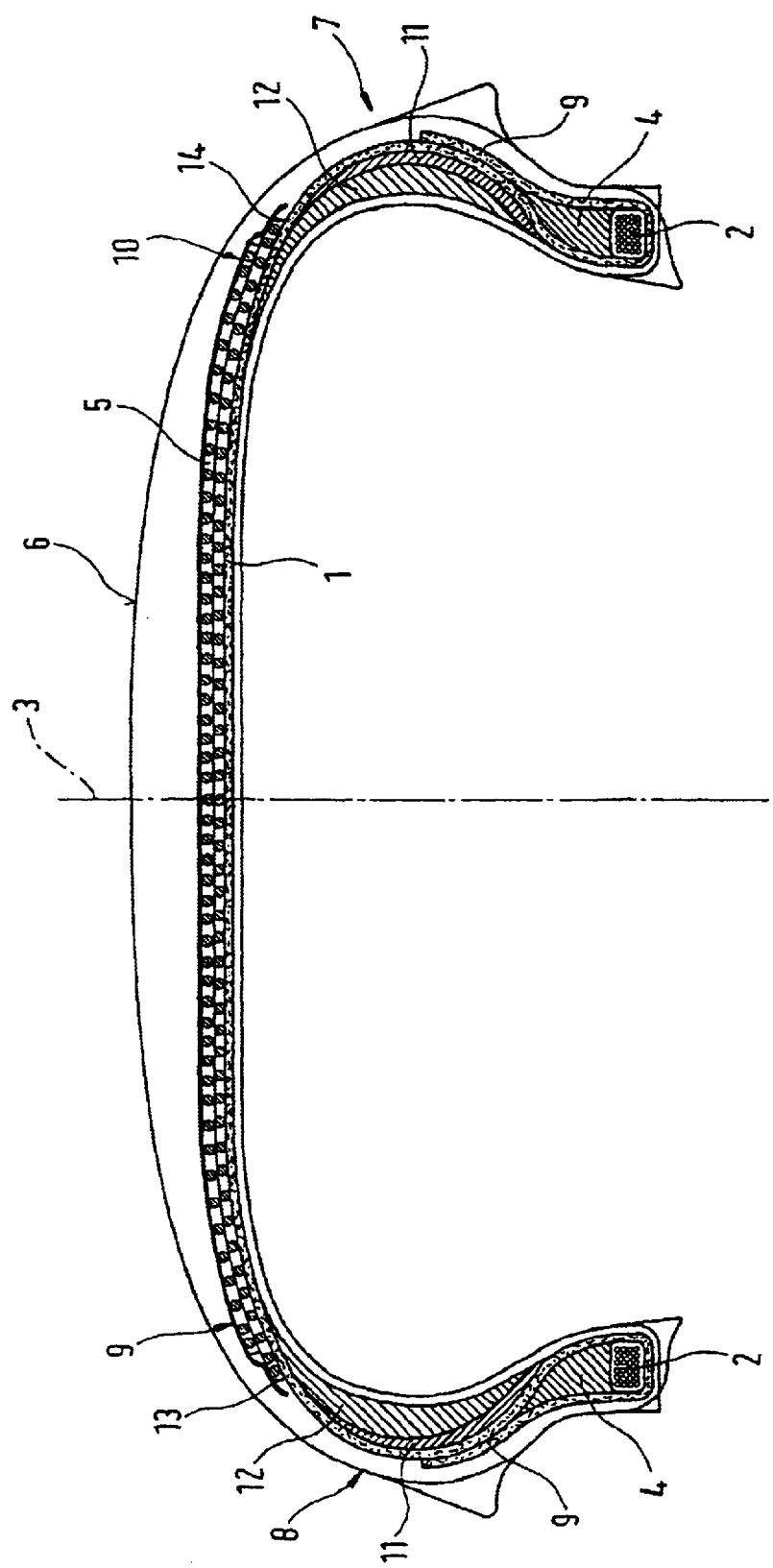

VEHICLE TIRE WITH CONTINOUSLY REDUCING VERTICAL SPACING OF TREAD SURFACE WITH RESPECT TO BREAKER

This application is the national phase under 35 U.S.C. §371 of PCT International Application No. PCT/EP00/08330 which has an International filing date of Aug. 26, 2000, which designated the United States of America.

TECHNICAL FIELDS

The invention relates to a vehicle tyre comprising a carcass ply extending between two bead regions, a tread region disposed between side walls and having a tread surface curved in the axial direction and a breaker reinforcing the tread region and arranged between the carcass ply and the tread region.

BACKGROUND ART

A vehicle tyre of this kind is known from DE 694 03 616 T2, in which the outer tread surface has a curvature which has a continually reducing radius from a point P located at a distance SP in the axial direction from the centre line of the tyre periphery which is equal to 20% of the distance from the tread centre to the neighbouring tread contact edge when the tyre is mounted on a tyre rim and normally pumped up. The contour of the breaker provided in this tyre follows the contour of the tread surface. Such a tyre however is not optimised and has problems in providing all the necessary properties at the same time.

It is the object of the present invention to provide a vehicle tyre which meets the demands made on a tyre ideally, in particular as regards weight, handling, safety, rolling resistance, comfort and the like.

DISCLOSURE OF THE INVENTION

This object is essentially satisfied in accordance with the invention, with a tyre mounted on a tyre rim and normally inflated, by the vertical spacing of the tread surface with respect to the breaker continually reducing, starting from the region of the tyre centre, towards the breaker edges and by the side walls being made at least essentially self-supporting.

It is in particular the spacing between the tread surface and the essentially flat or plane breaker, which is pre-set within the context of the teaching of the present invention, which allows the tyre to have an optimum shape. In particular, a comparatively narrow ground contact region can be realised, with a favourable change in the contact patch resulting during cornering, less heat being generated in the region of the belt edges as the belt edge is essentially only under strain during cornering, and with the shape and position of the breaker leading to good handling.

The side walls of the tyre are stiffened with reinforcing plies in such a way that the tyre becomes self-supporting. The shape and position of the reinforcements disposed within the carcass ply are selected so that, together with the bead core apex fully enclosed by the carcass ply, they form a stable assembly which acquires its required flexibility predominantly from the radially outer third of its height curved towards the tyre centre.

Further advantageous embodiments and features of the invention are given in the dependent claims and are described below with reference to the drawing in the description of an embodiment.

BRIEF DESCRIPTION OF DRAWINGS

The single FIGURE of the drawing shows a cross-sectional representation of a vehicle tyre in accordance with the invention.

MODE FOR CARRYING OUT THE INVENTION

In accordance with the drawing, the tyre comprises a single-ply carcass 1 which is turned around bead cores 2 and whose free ends 9 are led upwards approximately up to the region of the half height of the tyre while contacting the carcass.

Adjacent to the respective bead core 2, a core apex is provided which is fully enclosed by the carcass ply 2 and which has an approximately triangular shape in cross-section with a tip extending axially outwards.

A breaker 5 contacts the carcass ply symmetrically to the tyre center 3 and extends in an essentially plane manner in the axial direction, with said breaker 5 only being curved in the direction of the carcass ply 1 in the regions 9,10 of the breaker edges 13,14.

The breaker (5) may be comprised of either steel or aramide reinforcement. In particular, the the breaker (5) may be comprised of two steel cord plies, or alternatively, two aramide plies, lying on top of one another. The breaker width is preferably such that the breaker edges have a spacing either side of the center of the tire substantially the same as the tire beads from the center of the tire. The breaker may be bandage free.

The tread surface differs in a defined manner in the axial direction from the extension of the breaker 5 in such a way that said tread surface, when considered in cross-section, extends in accordance with an involute in the region of the tread centre and then merges into a free curvature to allow the contour to end in the bead region at the position pre-determined by the rim. The involute region provided at the tyre centre is selected to be increasingly narrower as the aspect ratio of the tyre becomes smaller.

The tyre of the present invention is characterized in that the tread which comes into contact with the ground during straight-ahead travel is significantly smaller than the tyre width. Preferably, approximately 25% to 30% (most preferably 28%) of the total tread surface is taken up by grooves or channels of the tread profile.

The radial spacing between the tread surface 6 and the breaker 5 reduces in a distinct manner towards the breaker edges and amounts in the region of the breaker edges to around 15% to 40%, in particular to 20% to 30%, of the corresponding spacing at the tread centre 3.

The side walls 7,8 of the tyre are formed to be self-supporting and for this purpose have reinforcing plies 11,12 which are crescent-shaped in section and are preferably made from materials of different properties, in order to achieve the required total stiffness on the one hand and to ensure the required flexibility on the other. In the embodiment shown, the outer reinforcing ply 11 is formed to be comparatively narrow relative to the inner reinforcing ply 12 and preferably ends radially outwardly in the region of the breaker edges 13,14 while the radially outer end of the inner reinforcing ply extends further over a pre-determinable region beneath the breaker 5.

The radially inner ends of the reinforcing plies 11, 12 overlap a little with the radially outer end of the bead core apex 4 so that overall a side wall structure is achieved which has its maximum wall thickness approximately at half-height between the lower edge of the tyre bead 2 and the breaker ply 5. The radially outer region of the reinforcing plies 11, 12, has a lower wall thickness and is formed more flexibly and produces the required side wall elasticity.

Deviating from the embodiment shown, the axial profile of the tread surface 6 can be formed to be asymmetrically curved with respect to the tyre centre in such a way that a deformation of the tyre contact patch caused by the wheel camber is transferred into a symmetrical tyre contact patch when the tyre is under strain.

What is claimed is:

1. A vehicle tire comprising a carcass ply (1) extending between two bead regions, a tread region disposed between side walls (7,8) any having a tread surface (6) curved in the axial direction and also a breaker (5) reinforcing the tread region and arranged between the carcass ply and tread region, wherein in the normally inflated state of the tire mounted on a tire rim, the vertical spacing of the tread surface (6) with respect to the breaker continuously reduces, starting from the region of the center of the tire (3), towards the breaker edges (13,14) and the side walls (7, 8) are made at least substantially self-supporting, and wherein the breaker (5) is made substantially flat over its entire width and is first curved in the direction of the carcass ply (1) in the region (9,10) of the breaker edges (13,14).

2. A tire in accordance with claim 1, wherein the breaker (5) is arranged free of intermediate plies on the single carcass ply (1).

3. A tire in accordance with claim 1, wherein the breaker (5) is comprised of steel.

4. A tire in accordance with claim 3, wherein the breaker is comprised of two steel cord plies lying on top of one another.

5. A tire in accordance with claim 1, wherein the breaker (5) is comprised of aramide.

6. A tire in accordance with with claim 5, wherein the breaker is comprised of two aramide plies lying on top of one another.

7. A tire in accordance with claim 1, wherein the tread surface (6) when considered in cross-section extends in accordance with an involute in the region of the center of the tire (3).

8. A tire in accordance with claim 1, wherein the radical or vertical spacing between the tread surface (6) and the breaker (5) ranges in the region of the breaker edges to from about 15% to 40% of the corresponding spacing at the center of the tread (3).

9. A tire in accordance with claim 8, wherein said radial or vertical spacing ranges from 20% to 30%.

10. A tire in accordance with claim 1, wherein the breaker edge (13,14) have a spacing with respect to the center of the tire (3) which is substantially the same as the spacing of the tire beads (2) from the center of the tire.

11. A tire in accordance with claim 1, wherein the essentially flat breaker (5) is bandage-free.

12. A tire in accordance with claim 1, wherein the side walls (7, 8) are each made at least substantially self-supporting via at least one reinforcement ply (11, 12) disposed inside the carcass ply (1), which respectively surrounds a bead core apex (4) from the inside to the outside and substantially radially radially outside the bead core apex (4) surrounded by the carcass ply (1).

13. A tire in accordance with claim 12, wherein the maximum thickness of the at least one reinforcement ply (11, 12) is disposed approximately at the half height of the tire.

14. A tire in accordance with claim 1, wherein the axial course of the tread surface (6) is selected to be asymmetrically curved with respect to the tire center (3).

15. A tire in accordance with claim 1, wherein the tread which comes into contact with the ground during straight-ahead travel is significantly smaller than the tire width.

16. A tire in accordance with claim 15, wherein approximately 25% to 30% of the total tread surface is taken up by grooves or channels of the tread profile.

17. A tire in accordance with claim 16, wherein approximately 28% of the total tread surface is taken up by grooves or channels of the tread profile.

* * * * *